INVENTORS.
MARK A. DEMING
RONALD H. BOLSTER

Sept. 29, 1959    M. A. DEMING ET AL    2,906,135
TRANSMISSION CONTROL VALVE
Filed July 24, 1957    3 Sheets-Sheet 3

INVENTORS.
MARK A. DEMING
RONALD H. BOLSTER
BY
ATTYS.

United States Patent Office 2,906,135
Patented Sept. 29, 1959

2,906,135

TRANSMISSION CONTROL VALVE

Mark A. Deming, Albion, and Ronald H. Bolster, Jackson, Mich., assignors to Clark Equipment Company, a corporation of Michigan Application July 24, 1957, Serial No. 673,825

8 Claims. (Cl. 74—364)

This invention relates to fluid pressure systems such as are employed to selectively operate and control clutches in the transmission of a vehicle such as a fork lift truck, tractor, and the like.

More particularly the invention is directed to a novel form of valve control device which may be used in such a system to direct fluid under pressure to selected groups of clutches while placing other clutches of the transmission, not so energized, under drainage. Although not limited thereto, the invention has particular application in a fluid pressure system used to operate a transmission such as described in the copending application of Ronald H. Bolster, Serial No. 607,470 filed August 31, 1956, now Patent No. 2,867,126. In said transmission both the input and output as well as intermediate shafts are provided with continuously meshing gears, some of which are fixed and others of which may be selectively clutched and declutched with respective shafts, the arrangement of gears being such that the output shaft may be driven at multiple forward and reverse speeds by selected actuation of appropriate groups of clutches which serve to bring into play different combinations of gears by which the output shaft is drivingly connected to the input shaft.

A first and general object of the invention is to provide a control device for such a fluid pressure system which will be convenient and practical to manufacture and at the same time efficient and effective in its operation.

A further object is to provide a novel and improved construction of valve control mechanism embodying an input port to receive fluid and a plurality of output ports individually connected by suitable conduits to means such as the clutches in a transmission as aforesaid described and employing a slide member or control gate which may be conveniently manipulated to selectively connect different combinations of output ports with the input port while connecting the remaining output ports, not thus connected, to drain into a suitable sump.

Thus, it is contemplated that in its preferred form, the invention will embody a speed ratio selector valve including a valve body having a cylindrically shaped cavity connected at its opposite ends to a reservoir of fluid and in which cavity is slidably mounted a valve plunger having a hollow bore containing a spool dividing said bore into a central annular hollow area and with cylindrical hollow areas on either side and separate thereof, the latter being ported to the interior of the cavity for communication with the reservoir or sump. The wall of the cavity has an input port and a number of output ports for connection through suitable conduits to respective clutches in a transmission and the valve plunger is provided with at least three ports which establish communication with the annular hollow interior of the plunger and said input and output ports of the cavity wall when properly aligned therewith. The relation as well as number of ports in the wall of the cavity is such that the plunger may be axially adjusted lengthwise of the cavity to locate two or more ports in alignment with different combinations of output ports while its first port remains in communication with the input port. Thus, by selective adjustment of the valve plunger, different combinations of clutches may be activated through feeding of pressurized fluid thereto from the input source. Venting ports are also selectively located in the walls of the plunger for communication with the cylindrical interior areas thereof and so disposed whereby when any two or more output ports are aligned in the manner aforesaid to receive pressurized fluid through the annular hollow interior of the valve plunger, the remaining clutches will have output ports in the cavity of the valve body in communication through said cylindrical areas with the reservoir or sump for purposes of drainage.

One of the features of a valve construction according to the invention is the disposition of both the ports in the valve plunger and in the surrounding wall of the cavity in the form of annuli whereby lateral pressure on the movable plunger will be equalized. In conventional valve structures, the inlet and outlet ports have comprised merely openings entering on one side of the valve so that, due to the high pressures involved, the slide is placed under considerable stress and with the result that wear occurs on the side of the valve opposite said openings. However, in the hereinafter described valve construction the conduits from the clutches as well as from the source of pressurized fluid enter grooves or recesses which are formed in the wall of the cavity and circumscribe the valve slide or plunger. The vents and ports in the valve slide are similarly annular in character but comprise groups of radially disposed ports spaced circumferentially thereabout, much in the manner of the spokes of a wheel.

A further object and/or feature of the present invention is the provision of means in a control valve of the type described whereby feed of pressurized fluid may be shifted between ports leading to forward motion imparting and reverse motion imparting clutches in a transmission without interrupting or otherwise affecting the flow of pressurized fluid into the outlet ports to the gear ratio controlling clutches. This is accomplished according to the present invention by utilizing a second cavity containing an axially slidable plunger or gate, said second cavity being ported to the input port of the first cavity to receive pressurized fluid and having outlet ports, one connected to the reverse clutch and the other to the forward clutch, either of which may be connected to the inlet port according to the axial adjusted position of the valve plunger. Therefore, in any adjustment of the forward-reverse valve plunger to deactuate one of these clutches, as in shifting from forward to reverse, the ratio controlling clutches are not simultaneously also emptied of their fluid but remained filled ready for immediate actuation as soon as either direction imparting clutch is connected with the input and filled with pressurized fluid. This arrangement considerably speeds up the shifting operation, since it is obvious that it takes time to fill a clutch with fluid, and if there are several clutches to fill, the time delay is proportionately greater.

A further feature of a valve control device according to the present invention is the inclusion of a third slide or gate which is mounted to move under the action of the braking mechanism of the vehicle to shut off the flow of pressurized fluid between the ratio selector valve cavity and the direction imparting valve control cavity whereupon, under the release of the brake pedal, it may be gradually opened to permit inching of the vehicle in the direction for which the direction imparting control valve slide is set.

Many other objects and/or advantages and features of the invention will be or will become apparent from the description of a preferred embodiment thereof which follows. However, it will be understood that the description which follows is not to be taken in a limiting sense, but merely as descriptive of the invention since many changes and/or modifications will be suggested from said description and are intended to be included within the spirit of the invention as defined in the appended claims.

Figure 1:
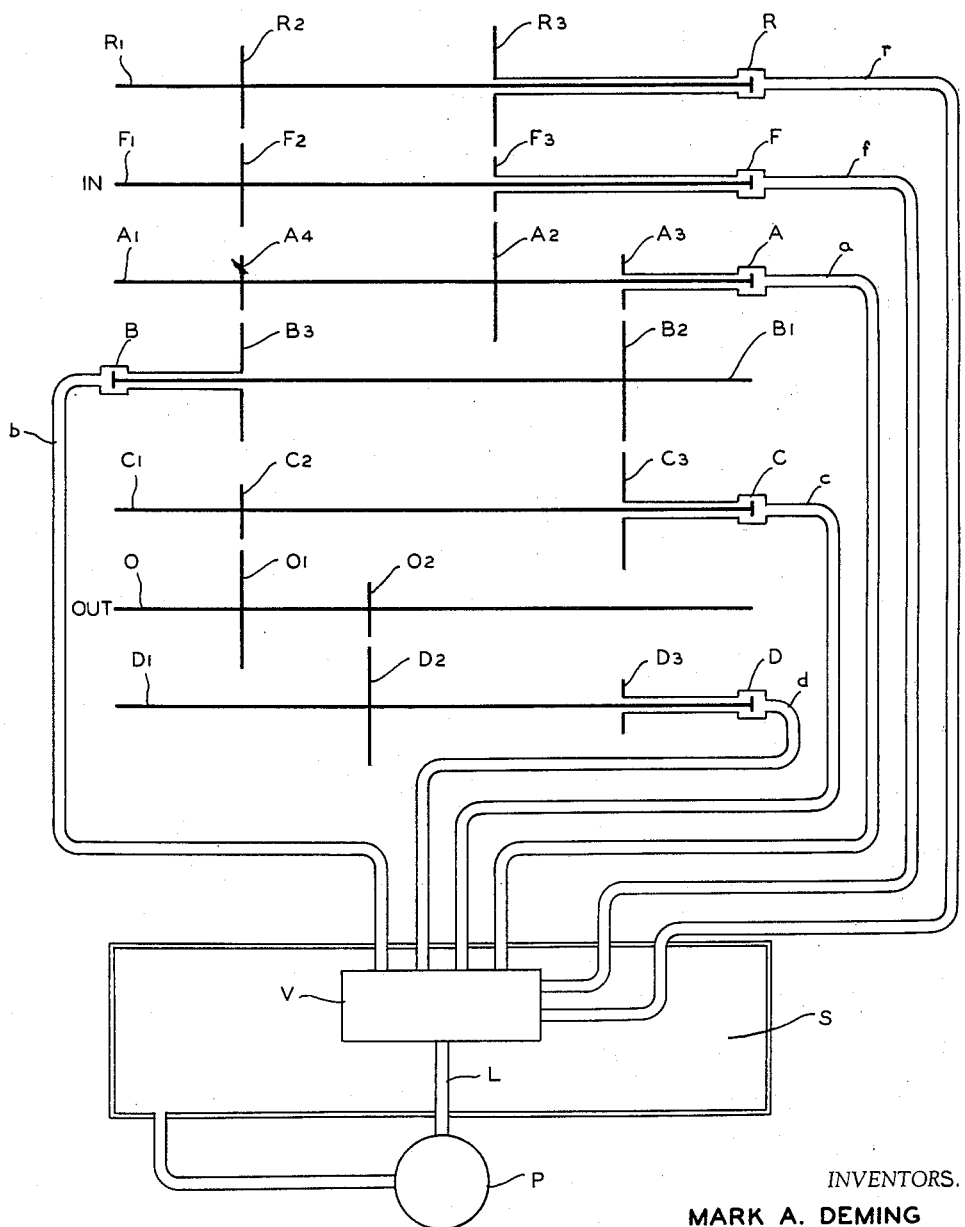
Figure 1 is a view in schematic form of a transmission having hydraulically controlled clutches in accordance with the present invention.

Now referring to the several views wherein like parts are identified by like reference numerals or letters, and first to Figure 1, a transmission and hydraulic system for controlling the operation of the same is there diagrammatically illustrated as comprising an input shaft F1 on which is fixedly mounted gear F2 and rotatably mounted gear F3, the latter being clutchable to shaft F1 by suitable actuation of clutch means F so as to drive gear A2 fixedly mounted on shaft A1 in one direction. Gear R2 fixedly mounted on shaft R1 is also in mesh with gear F2 fixedly mounted on shaft F1. Consequently, gear R3 rotatably mounted on shaft R1 and in mesh with gear A2 may be optionally clutched to shaft R1 so as to drive gear A2 in the reverse direction. Thus clutch F may be considered as a forward direction imparting clutch means and clutch R as a reverse direction imparting clutch means.

Shaft A1 has a gear A4 fixedly mounted thereon and in mesh with gear B3 rotatably mounted on shaft B1 and cluchtable thereto by actuation of clutch B. Shaft A1 also has a gear A3 rotatably mounted thereon and clutchable thereto by actuation of clutch A. Gear A3 meshes with a second gear B2 fixedly mounted on shaft B1 and which gear B2 meshes with both gear C3 rotatably mounted on shaft C1 and gear D3 rotatably mounted on shaft D1. Gear C3 may be clutched to its shaft C1 by suitable actuation of clutch C and likewise gear D3 may be clutched to shaft D1 by actuation of clutch D. Shaft C1 also has a second gear C2 fixedly mounted thereon in mesh with gear O1 fixedly mounted on the output shaft O while shaft D1 has a second gear D2 fixedly mounted thereon and in mesh with gear O2 fixedly mounted on shaft O. The several gears above referred to as fixedly or clutchably mounted on shafts A1, B1, C1, D1, and O are suitably related in size so that, by appropriate clutching, four different gear ratios may be utilized for conveying motion from the input shaft to the output shaft according to whether pairs of clutches A—C, A—D, B—C, or B—D are actuated and in a forward or reverse direction depending on whether clutch F or R is additionally actuated.

Said clutches as illustrated in Figure 1, are operated by forcing fluid under pressure from reservoir or sump S by means of a pump P through conduit L into distributing valve V, and therefrom into conduits r, f, a, b, c or d, leading to the respective clutches R, F, A, B, C, and D; said conduits also serving to drain fluid from the respective clutches back through the distributing valve to the sump when it is required to release the clutches. For a more detailed description of the aforesaid transmission and its operation, reference may be had to the mentioned Ronald H. Bolster copending application.

Figure 2:
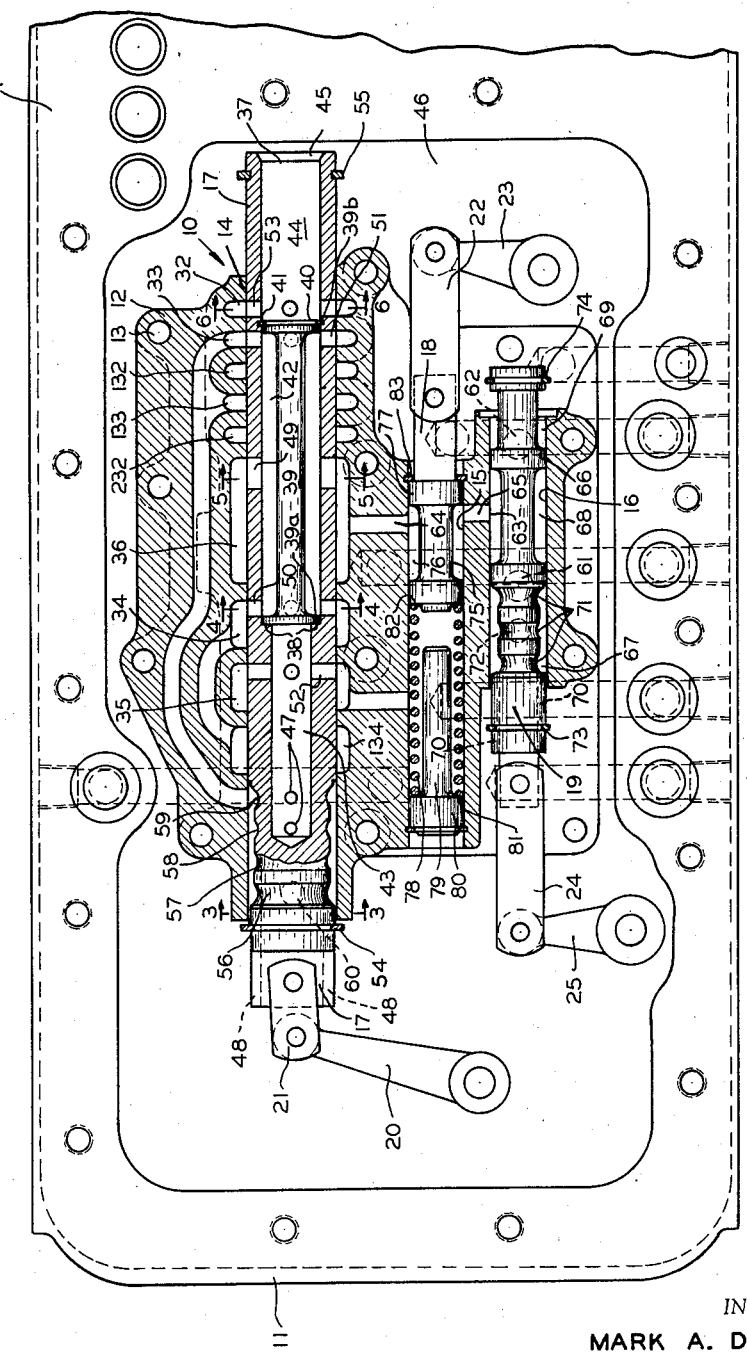
Figure 2 is a plan view in side elevation of a valve control device as used in the system of Figure 1 and with the cover removed from the housing, portions of the valve body and plungers having been cut away to render more clear an understanding of the related parts.

Now referring more particularly to Figure 2 wherein is illustrated the distributing valve V in more detail and which represents the novel part of the present invention, 11 represents one end of the transmission housing T. Housing 11 serves as a sump or reservoir for the clutch actuating fluid and is normally closed by a cover (not shown) to which the control unit 10 is attached.

The valve control device itself comprises a main body 12 secured by bolts 13 or the like to the cover (not shown) and has three parallel spaced cylindrically shaped cavities or bores 14, 15 and 16 extending therethrough and which open at either end into the interior of housing 11. Within said cavities are journalled for axial sliding adjustment plungers 17, 18 and 19, respectively. Each of said plungers is connected to an operating lever or the like (not shown) by suitable linkage which in the case of plunger 17 includes an arm 20 and connecting link 21, the latter being pivotally connected at one end to arm 20 and at its other end to plunger 17. Plunger 18, similarly, has one end thereof pivotally connected to link 22, and which in turn is pivotally connected to arm 23. Plunger 19 also has one end pivotally connected to link 24, and which in turn is pivotally connected to arm 25. As previously mentioned arms 20 and 25 may be coupled to suitable operating mechanism such as a lever or the like while arm 23 is preferably coupled to the brake pedal for a reason which will hereinafter be made clear.

Figure 4:
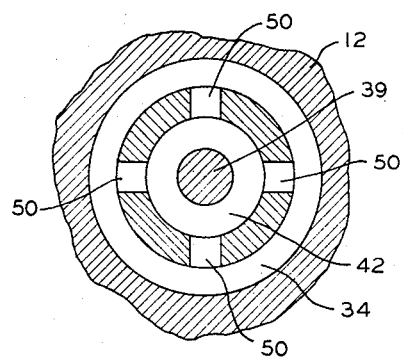
Figure 4 is a fragmentary sectional view taken through the device along lines 4—4 in Figure 2 looking in the direction indicated by the arrows.
Figure 5:
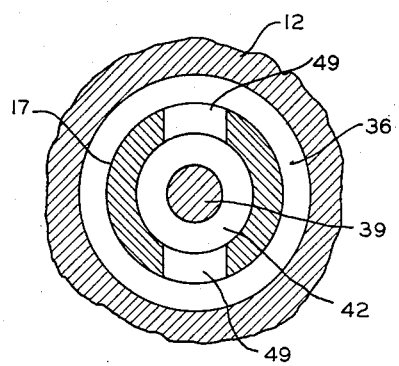
Figure 5 is a fragmentary sectional view taken through the device along lines 5—5 of Figure 2 looking in the direction indicated by the arrows.
Figure 6:
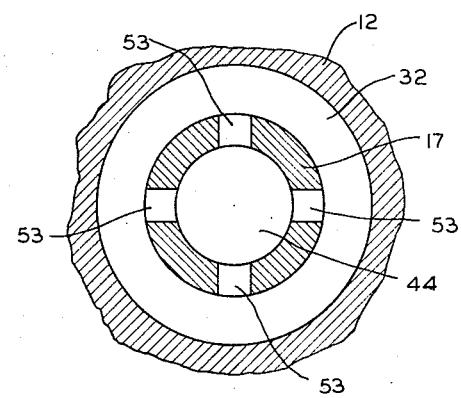
Figure 6 is a fragmentary sectional view taken through the device along lines 6—6 of Figure 2 looking in the direction indicated by the arrows.

Therefore in order to selectively actuate clutches A, B, C and D in the aforesaid combinations so as to establish the ratio of gearing by which the input shaft A is driving connected to the output shaft O, the aforementioned conduits a, b, c and d which lead from said clutches A, B, C and D to the valve V are ported into annular circumferentially extended grooves or recesses provided at spaced locations axially of the wall of cavity 14 and so as to circumscribe the plunger 17, see Figures 4 and 6 for example. Thus conduit a connects fluid clutch A via branch lines (not shown) in the valve body 12 with annular output ports 32, 132 and 232. Conduit b connects clutch B to a pair of annular output ports 33 and 133, while conduit c connects clutch C to a pair of annular output ports 34 and 134, and conduit d connects clutch D to annular groove 35.

Pressurized fluid is delivered to the cavity from the interior of the housing by means of a pump P through line L which connects with input port 36 which, like the aforementioned output ports is also in the form of an annular circumferentially extending recess in the wall of cavity 14 circumscribing plunger 17, although it is necessarily formed considerably wider for a reason which hereinafter will be made clear.

Figure 3:
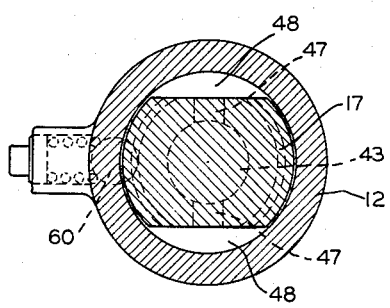
Figure 3 is a fragmentary sectional view taken through the device along lines 3—3 in Figure 2 looking in the direction indicated by the arrows.

As illustrated in Fig. 2 of the drawing valve plunger 17 has a central bore 37 which is reduced in diameter at its inner end to provide a shouldered portion 38 against which the flanged end 39a of spool 39 engages. Spool 39 is retained in place by means of a snap-ring 40 resiliently resting in a suitably provided recess 41 in the wall of plunger 17 and bears against the opposed flanged end 39b of spool 39. Spool 39 thus serves to divide the hollow interior of plunger 17 into an intermediately disposed annular fluid receiving area 42 which circumscribes the smaller diametered body of the spool 39 and a pair of cylindrical fluid receiving areas 43 and 44 on opposed sides of the spool which are separated from each other and from the annular fluid receiving area 42. Cylindrical area 44 communicates through the open ends 45 of the plunger 17 directly into the interior of the housing 11 while cylindrical area 43 on the opposite side of the spool 39 is vented through suitable ports 47 leading into longitudinally extending channels 48 (see Figs. 2 and 3) having communication with the interior 46 of the housing 11. If desired, spool 39 could be provided with a central bore so as to connect areas 43 and 44 and in which event it would be possible to dispense with venting channels 48, and ports 47.

Valve plunger 17 further has an input port 49 and a pair of output ports 50 and 51 disposed on opposed sides thereof and adjacent the flanged ends 39a and 39b of the spool which communicates through the wall of the valve plunger with the annular area 42. It also has a pair of venting ports 52 and 53 which communicate through the wall thereof with the cylindrical fluid receiving areas 43 and 44. As illustrated in Figs. 2, 4, 5 and 6 these ports each comprises, preferably, a plurality of openings arranged equidistantly about the plunger 17 analogous to the spokes of a wheel.

In order that plunger 17 may effectively function to distribute pressurized fluid between the several clutches while allowing those clutches not to be actuated, to drain off fluid, the location of the ports both in the plunger 17 and in the wall of cavity 14 are arranged in the relation illustrated by Figure 2. When so spaced, the output ports 50 and 51 as well as the venting ports 52 and 53 thereof can be selectively aligned, in four different positions of adjustment of the plunger 17, with different combinations of output ports in the wall of cavity 14 while its input port 49 remains in communication with input port 36. By such means, in the different positions of adjustment of plunger 17 in cavity 14 fluid may be effectively channeled from pump P through line L to port 36, and through annular area 42 and aligned output ports to a selected pair of clutches AC, AD, BC or BD while fluid contained in the pair of clutches not thus connected may drain through respective output ports in the wall of cavity 14, through venting ports 52 and 53, into the cylindrical areas 43 and 44 of the plunger 17 and into the receiving area 46 of the hollow housing 11 or sump S.

Thus in Fig. 2 output ports 50 and 51 of valve plunger 17 are shown having communication with the output recessed ports 34 and 33 of the cavity 14 so that clutches B and C are energized. Venting ports 52 and 53, on the other hand, are aligned with output ports 35 and 32 of the cavity 14 so as to permit fluid to drain from clutches D and A, respectively while remaining annular output ports 132 and 133, 232 and 134 in the wall of cavity 14 are effectively sealed by the solid wall of the plunger 17 so that they play no part in this illustrated position of adjustment of plunger 17.

However plunger 17 may be moved a selected distance to the left of Fig. 2 so as to bring its port 51 into alignment with output port 132 while retaining its port 50 in communication with output port 34 and thus serving to energize the combination of clutches A and C. In this new position of adjustment of valve plunger 17 its venting port 52 still remains in alignment with output port 35 but its venting port 53 has been moved into alignment with output port 33 whereby clutches B and D will be permitted to drain.

Similarly the valve plunger 17 may be moved by the same amount still further to the left of Fig. 2 to a third station where its port 50 is brought into alignment with output port 35 of the valve cavity 14 and in which event port 51 of the plunger will be brought into alignment with output port 133 thus energizing clutches D and B. In this third position of adjustment of the plunger, its venting port 52 will be in alignment with output port 134 and its venting port 53 will be in alignment with output port 132 so that fluid may drain from clutches A and D.

The valve plunger 17 may also be adjusted further to the left an equal amount to a fourth position in which its port 50 is retained in alignment with output annular port 35 but its other port 51 is brought into alignment with output annular port 232 in the cavity 14 of the valve body so as to energize clutches C and A while its venting port 52 is kept in alignment with annular output port 134 and its venting port 53 moved into alignment with annular output 133 of cavity 14 to allow fluid to drain clutches A and C.

Obviously other variations in the size and number as well as arrangement of output ports connected with the conduits a, b, c and d might be worked out and furthermore a similar system of output ports could be worked out for operating a different number of clutches and/or in different combinations, as for example, where it would be necessary that three clutches be simultaneously energized or only one clutch be energized at a time. Where three clutches were to be energized simultaneously, of course, the valve plunger 17 would have to be provided with three output ports communicating with its annular fluid receiving area 42 while if only one clutch needed to be energized at a time only one output port would be required. A corresponding modification in the number of venting ports would also be necessary.

Preferably the ends of plunger 17 are provided with stop rings 54 and 55 seated in suitable recesses and adapted to engage against marginal portions of valve body 12 about the ends of cavity 14 in order to prevent over shifting of valve plunger 17. One end of plunger 17 may also be provided with suitably spaced circumferentially extending grooves 56, 57, 58 and 59 to receive spring pressed ball detent 60, and by which means the plunger may be releasably locked in its four positions of adjustment and are thus spaced apart a distance equal to the amount of adjustment required of the plunger 17 to move between stations.

Valve cavity 16 and plunger 19, adjustably journalled therein, serve to control actuation of the reverse and forward direction controlling clutch mechanisms R and F. For this purpose, fluid conduits r and f are ported into the wall of cylindrical cavity 16 at 61 and 62 respectively. Preferably said ports 61 and 62 are disposed in spaced relation on opposite sides of input port 63 through which pressurized fluid may enter cavity 16 from the annular input recess 36 of cavity 14 through conduit channel 64, cavity 15 and connecting channel 65. To selectively shunt pressurized fluid entering ports 63 to either of ports 61 and 62, valve plunger 19 is provided with a pair of spaced annular raised sections 66 having sliding contact with the wall of cavity 16 and effectively dividing the valve plunger 19 into separated annular fluid directing channels 67, 68 and 69. Annular channel 69 has direct communication with the interior 46 of the housing 11 through the open end of cavity 16 while area 67 at the opposite end of plunger 19 communicates through grooves 70 with the interior 46 of the housing 11. Said raised sections 66 further are so dimensioned and spaced that the fluid channeling area 68 therebetween has a length less than that separating ports 61 and 62 so that by suitable actuation of the plunger 19 to the right or to the left of its position indicated in Fig. 2, either port 61 or port 62 may be selectively brought into communication through the annular fluid channel 68 with pressurized fluid entering port 63 while the other of said ports 61 and 62 will be aligned with either annular channel area 67 or 69, as the case may be. Thus by selective adjustment of plunger 19, either of clutches R or F may be actuated by the feeding of pressurized fluid through one of ports 61 and 62 and the other clutch deactuated, and fluid permitted to drain therefrom through its conduit and port into the interior of the housing 11. Preferably, plunger 19 has a neutral position, as indicated in Figure 2, where neither output port 61 or 62 communicates with channel 63 and both are set for fluid draining. In this position neither clutch R or F is energized and output shaft O does not turn.

In order to positively lock the valve plunger 19 in either of its three possible positions, reverse, neutral or forward, the valve plunger is provided with three appropriately spaced circumferential grooves 71 so as to be releasably engaged by a spring pressed ball detent 72 in a manner similar to the means of locking plunger 17 in its various positions of possible adjustment. Snap rings 73 and 74 are also provided in suitable recesses adjacent the opposed ends of the valve plunger 19 so as to limit the extent of the sliding movement thereof.

If desired, an inching valve may also be provided to interrupt passage of pressurized fluid from the input recess of cavity 14 to the forward-reverse clutch controlling valve cavity 16, which inching valve has connection with the fluid circuit of the vehicle's brakes whereby when the brakes are actuated, fluid in the brake circuit will act on the inching valve to shift the latter to a position interrupting fluid flow to cavity 16. When the brake pedal is released, the inching valve plunger may be returned to its normal position reestablishing communication between cavities 14 and 16. Thus in Fig. 2, pressurized fluid from annular input recess 36 of valve cavity 14 passes from conduit 64 through cavity 15 through connecting conduit 65 in order to reach cavity 16 in which plunger 19 operates to control the direction in which output shaft O is driven. To effectively interrupt this flow of pressurized fluid to cavity 16, plunger 18 is slidably journalled in cavity 15 and is connected through the aforedescribed link 22 and arm 23 to the braking fluid circuit (not shown) so as to be operable thereby. Said plunger 18 has a reduced section 75 providing an annular area 76 through which may flow pressurized fluid from conduit 64 into channel 65 illustrated in Fig. 2. However, by suitable actuation of arm 23, plunger 18 may be moved to the left in cavity 15 to effectively cut off communication of conduit 65 with area 76 and cause fluid to drain from conduit 65 around raised annular section 77 thereof into the interior of the housing 11 to prevent operation of the reversing and forward directing clutch mechanism. Such movement of plunger 18 to the left of Figure 2 is obtained against the action of a spiral compression spring 78 which is located in the left hand of said cavity 15 about the reduced section 79 of a plug 80, and abutting at one end against the shoulder 81 provided by the head of said plug 80, the other end of said compression spring normally engaging seat 82 provided therefor in the end of plunger 18 and urging it to the right of Figure 2. The action of compression spring 78 on plug 80 is resisted by a snap ring 83 seated in a groove provided therefor in the wall of cavity 15 against which portion 77 of the plunger is engaged as shown in Figure 2. By the aforesaid construction, plunger 18 may be moved to the left of Figure 2 against the action of compression spring 78 to close off the entrance to port 63 and may be gradually reopened by releasing pressure applied counter clockwise to arm 23 and allowing spring 78 to urge plunger 18 to the right again. Thus it will be clear that the size of entrance into port 63 may be gradually increased under the control of the operator to enable him to move the vehicle by small increments in the direction for which valve plunger 19 is set and whereby drive may be interrupted and reestablished quickly and positively to permit inching of the vehicle without interfering with other functions of the vehicle.

Desirably, the interior 46 of housing 11 contains the fluid used to actuate the several clutches or at least acts as an auxiliary reservoir feeding into a main storage area. Such an arrangement has the advantage that not only is drainage from the several clutches through the valve considerably simplified, but the presence of such fluid in storage about the valve also serves as a means of lubricating its various operating parts. Furthermore the arrangement obviates the need of having pressure tight seals between the several valve plungers 17, 18 and 19 and the respective cavities in which they operate.

All of the objects and advantages of the invention thus have been demonstrated as obtainable in a convenient simple and practical manner.

Having described our invention we claim:

1. A selector valve comprising a valve body having a cavity in which a plunger is slidably mounted for adjustment to a number of predetermined stations, said plunger having a hollow bore containing fixed means dividing its interior into a first chamber and a second chamber separate therefrom, said second chamber being adapted for communication with a sump, said valve body having an inlet to receive fluid under pressure and a plurality of outlets for connection to mechanism to be selectively actuated in pairs by said valve, said cavity wall having a recess communicating with said inlet and a plurality of further recesses communicating with said outlets, each said outlets being in communication with at least one of said further recesses, and the number of said further recesses being in excess of the number of outlets, said valve plunger having an input port and a pair of output ports communicating with its said first chamber and venting ports communicating with its said second chamber, the relation of said inlet communicating recess and the input port of the plunger being such that in each station to which the plunger is adjustable said input port remains in communication with the inlet whereby the first chamber of the plunger is continuously supplied with pressurized fluid, the relation of the output ports to the input port of the plunger and said further recesses to said inlet-communicating recess and to each other being such that in each said stations, the output ports align with a pair of said further recesses each having communication with a different outlet, the two outlets thus aligned constituting a different combination of outlets for each station to which the plunger is adjustable, and said venting ports being related to said output ports whereby the venting ports align with further recesses having communication with outlets other than the two outlets communicating with the said recesses in alignment with said output ports, and the wall of the plunger serving to occlude the remaining recesses, whereby at each station to which the plunger is adjustable two different outlets will be supplied through the first chamber of the plunger with pressurized fluid and the other outlets will be vented through the second chamber of the plunger for drainage to the sump.

2. A selector valve comprising a valve body having a cylindrically shaped cavity opening at its opposite ends into a reservoir of fluid, a plunger slidably mounted in said cavity for adjustment to a number of predetermined stations, said plunger having a hollow bore containing a spool dividing its interior into a central annular chamber and cylindrical end chambers on either side and separate therefrom, said end chambers being ported for communication with the reservoir, said valve body having an inlet to receive fluid under pressure from said reservoir and a number of outlets greater than two for connection to mechanism to be selectively actuated in pairs by said valve, said cavity wall having a relatively wide circumferentially extending recess communicating with said inlet and a plurality of narrower circumferentially extending recesses communicating with said outlets, each said outlets being in communication with at least one narrower recess, and the number of narrower recesses being in excess of the number of outlets, said valve plunger having an input port and a pair of output ports communicating with its said central chamber and venting ports communicating with its said end chambers, the width of said wide recess and the relation of the input port of the plunger thereto being such that in each station to which the plunger is adjustable said input port remains in communication with the inlet whereby the central chamber of the plunger is continuously supplied with pressurized fluid, the relation of said output ports to the input port of the plunger and the relation of said narrower recesses of the cavity wall to said wide recess and to each other being such that in each station to which said plunger is adjustable the output ports will align with a pair of said narrower recesses each of which has communication with a different one of said outlets, and said venting ports being related to said output ports whereby the venting ports align with narrower recesses having communication with outlets other than the two outlets communicating with said narrower recesses in alignment with said output ports, and the wall of the plunger serving to occlude the remaining narrower recesses, whereby at each station to which the plunger is adjustable a different combination of two outlets will be supplied through the central chamber of the plunger with pressurized fluid and the remaining outlets will be vented through the end chambers of the plunger for drainage to the reservoir.

3. In a fluid control system, a housing forming a fluid reservoir and a fluid control valve mounted in said housing comprising a valve body having a cavity opening at either end thereof into the interior of the housing, a plunger journalled in said cavity for axial sliding adjustment to a number of predetermined stations, said plunger having a hollow bore containing means fixed therein dividing its interior into a central chamber and end chambers on either side and separate therefrom, said end chambers being ported to the open end of said cavity for communication with the reservoir, said valve body having an inlet to receive fluid directed thereto under pressure from said reservoir and a plurality of outlets for connection to mechanism to be selectively actuated in pairs by said valve, said cavity wall having a relatively wide circumferentially extending recess communicating with said inlet and a plurality of narrower circumferentially extending recesses communicating with said outlets, each said outlets being in communication with at least one narrower recess, and the number of narrower recesses being in excess of the number of outlets, said valve plunger having an input port and a pair of output ports communicating with its said central chamber and venting ports communicating with the end chambers, said input, output and venting ports each being comprised of a plurality of openings circumferentially spaced about said plunger and extending through the wall thereof, the width of said inlet communicating recess and the relation of the input port of the plunger thereto being such that in each station to which the plunger is adjustable said input port remains in communication with the inlet whereby the central chamber of the plunger is continuously supplied with pressurized fluid, the relation of the said narrower recesses to said inlet-communicating recess and to each other, and the output ports of the plunger to the input port thereof, being such that in each station to which said plunger is adjustable the output ports will align with predetermined pairs of narrower recesses so as to have communication with different combinations of outlets, and said venting ports being related to said output ports whereby the venting ports align with narrower recesses having communication with outlets other than those outlets communicating with the narrower recesses in alignment with said output ports, and the wall of the plunger serving to occlude the remaining narrower recesses, whereby at each station to which the plunger is adjustable a different combination of outlets will be supplied through the central chamber of the plunger with pressurized fluid from the inlet as the remaining outlets are vented through the end chamber of the plunger for drainage of fluid therefrom into the reservoir.

4. In a fluid control system, a valve according to claim 3 having a second cavity opening at either end into the interior of the housing and a plunger journalled in said second cavity for axial sliding adjustment, said second cavity having a pair of output ports one adjacent either end thereof, and an entering port disposed between said output ports, said entering port having communication with the inlet of the first cavity, and said plunger journalled in said second cavity being adapted to selectively channel pressurized fluid from the entering port to either one of the output ports of the second cavity while allowing the other one of said output ports to drain off fluid through the end of said cavity into the interior of the housing.

5. In a fluid control system, a valve according to claim 3 having gate means which may be independently controlled to shut off communication between the inlet and entering ports of the second cavity and then gradually opened at a controlled rate.

6. A fluid control unit for use with transmissions having a forward direction imparting fluid operated clutch and a reverse direction imparting clutch which control the direction in which an outlet shaft is rotated by an input shaft and a group of intermediate clutches selectively actuated by pairs to drivingly connect the input shaft to the output shaft by different ratios of gears, said fluid control unit comprising a housing attached at one end of the transmission forming a fluid reservoir and a fluid flow control valve mounted within said housing comprising a valve body having two cavities each opening at either end thereof into the interior of the housing in which are journalled a pair of plungers for axial sliding adjustment to a number of predetermined stations, said valve body having an inlet to receive fluid directed thereto under pressure from said reservoir, a pair of ports one for connection to the reverse direction imparting fluid clutch and the other for connection to the forward imparting clutch, and a plurality of outlets for connection to respective ones of said clutches to be selectively actuated by pairs to drivingly connect the input shaft to the output shaft, the wall of one cavity having a relatively wide circumferentially extending recess communicating with said inlet and having a plurality of narrower circumferentially extending recesses communicating with said outlets, each said outlets being in communication with at least one narrower recess, and the number of narrower recesses being in excess of the number of outlets, the plunger journalled in said one cavity having a hollow bore containing means fixed therein dividing its interior into a central chamber and end chambers on either side and separate therefrom, said end chambers being ported for communication with the reservoir, said valve plunger having an input port and a pair of output ports communicating with its said central chamber and venting ports communicating with its end chambers, said input, output and venting ports being comprised of a plurality of openings arranged about said plunger and extending through the wall thereof, the width of said inlet communicating recess and the relation of the input port of the plunger thereto being such that in each station to which the plunger is adjustable said input port remains in communication with the inlet whereby the central chamber of the plunger is continuously supplied with pressurized fluid, the relation of the said narrower recesses to said inlet-communicating recess and to each other, and the output ports of the plunger to the input port thereof, being such that in each station to which said plunger is adjustable, the output ports will align with pairs of narrower recesses so as to have communication with different combinations of outlets, and said venting ports being related to said output ports whereby the venting ports align with narrower recesses having communication with outlets other than those outlets communicating with the narrower recesses in alignment with said output ports, and the wall of the plunger serving to occlude the remaining narrower recesses, whereby in accordance with the station to which the plunger is adjusted a different combination of gear ratio controlling clutches will be energized by pressurized fluid supplied thereto through their communicating outlets as the other gear ratio controlling clutches are drained of fluid to deactivate the same, said second cavity having a pair of first openings in the wall thereof communicating with said ports adapted for connection to the direction imparting clutches, and a third opening in said wall intermediate said first two openings having communication with the inlet to receive pressurized fluid, and the plunger journalled in said second cavity being adjustable between a pair of stations to selectively direct the pressurized fluid from said third opening into one of said first openings while allowing fluid to drain from the other into the housing to selectively actuate one of the direction imparting clutches and deactivate the other.

7. A fluid control unit according to claim 6, wherein the valve body has a third cavity and a plunger also mounted therein for sliding axial adjustment, said third cavity having a pair of ports, one connecting through a suitable conduit to the inlet and the other connecting to the third opening in the second cavity, and said plunger in the third cavity being operable to shut off communication between the two ports thereof to prevent flow of pressurized fluid into said second cavity and then to gradually restore communication at a controlled rate.

8. A fluid control unit according to claim 6 wherein the means fixed in the plunger in the first cavity comprises a spool-like member dividing its hollow bore into an intermediate annular area establishing communication between the input and output ports of the plunger and a cylindrical separate chamber on either side thereof communicating with the venting ports and ends of the plunger having communication into the interior of the housing.

References Cited in the file of this patent

UNITED STATES PATENTS

| | | |
|---|---|---|
| 2,170,538 | Sarver | Aug. 22, 1939 |
| 2,282,591 | Orr | May 12, 1942 |
| 2,512,730 | Adams | June 27, 1950 |
| 2,772,694 | Simmons | Dec. 4, 1956 |
| 2,775,260 | Drennen | Dec. 25, 1956 |